Jan. 11, 1944.   V. H. BODLE ET AL   2,339,142
CARPET UNDERLAY OR THE LIKE AND METHOD OF MAKING SAME
Filed Aug. 3, 1940

George W. Blair
and Virgil H. Bodle
INVENTORS

BY Eugene M. Giles
Atty.

Patented Jan. 11, 1944

2,339,142

UNITED STATES PATENT OFFICE 2,339,142

CARPET UNDERLAY OR THE LIKE AND METHOD OF MAKING SAME

Virgil H. Bodle and George W. Blair, Mishawaka, Ind., assignors to Mishawaka Rubber and Woolen Manufacturing Company, Mishawaka, Ind., a corporation of Indiana Application August 3, 1940, Serial No. 350,959

5 Claims. (Cl. 117—65)

This invention relates to a new and improved carpet underlay material and method of making same and has reference more particularly to an underlay material having peculiar and extraordinary frictional resistance which not only safeguards against any slippage of the material on the floor but also avoids any shifting of the rug or carpet on the underlay. The material also has the advantage that it is not thick or bulky, has excessive strength and great durability, is waterproof and highly sanitary, is relatively inexpensive and also has cushioning properties to protect the rug or carpet and add softness thereto.

Considerable difficulty has been experienced heretofore in connection with carpeting and especially throw rugs or the like to safeguard against slippage thereof which not only is embarrassing but oftentimes hazardous. Ordinary carpet underlay is not suitable or satisfactory as it is usually designed particularly for cushioning purposes and is of such thickness that rugs and especially those of relatively small size are conspicuously and undesirably elevated and moreover most underpadding does not have any substantial nonslipping characteristics.

The principal objects of this invention are to provide an improved carpet underpadding or the like which completely safeguards against rug slippage; to permit construction thereof in a relatively thin form which does not conspicuously or appreciably elevate the rug or carpet; and to construct the material in a particularly simple and economical manner, these and other objects being accomplished as more particularly pointed out hereinafter and as shown in the accompanying drawing in which, Fig. 1 is an enlarged face view of a small section of material made in accordance with this invention;

Figure 5:
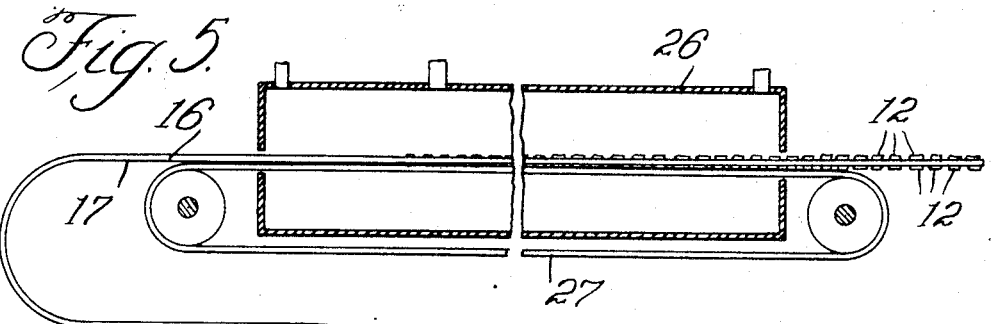
Fig. 5 is a view showing somewhat diagrammatically equipment that may be employed for making this underlay.
Figure 1:
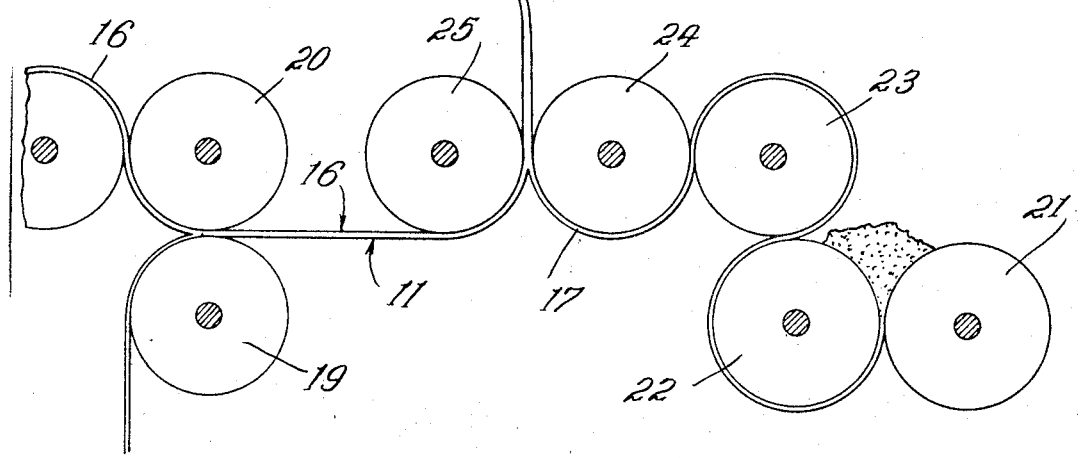
Figure 1:
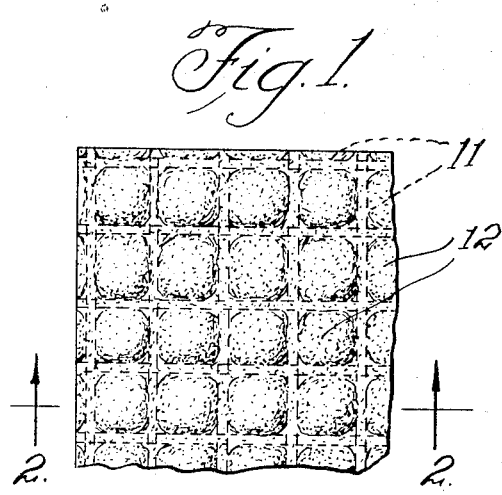

The material of this invention comprises a fabric, preferably loosely woven such as burlap, Osnaburg or the like with spongy rubber material combined therewith so as to provide a surface having innumerable small protuberances which constitute gripping or non-skid elements which impart a peculiarly effective frictional engagement by reason of which slippage of the material on a floor is entirely prevented. Preferably, and as shown herein, the material has similar protuberances on both sides so that it is reversible and also prevents shifting of the carpet material thereon.

Referring to the drawing, the fabric, which is indicated at 11, is of open mesh type with interstices therethrough into which sponge rubber compound is pressed before blowing thereof so as to completely fill the interstices and become securely bonded to the fabric threads, after which the sponge rubber compound is blown and vulcanized and forms at each of the interstices a bulge formation or protuberance 12 at each side of the fabric and of soft compressible texture so that each of these interstitial formations 12 constitutes an individual gripping element with depressions or crevices 13 between the adjoining formations 12, which because of the numerousness of such formations or protuberances and crevices offers an exceedingly high frictional adherence to any surface in contact therewith.

Figure 4:
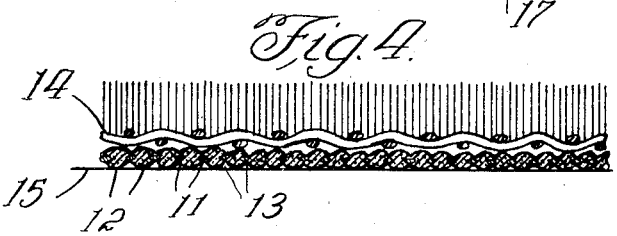
Fig. 4 is a sectional view somewhat enlarged showing the combined carpeting and underlay.
Figure 2:
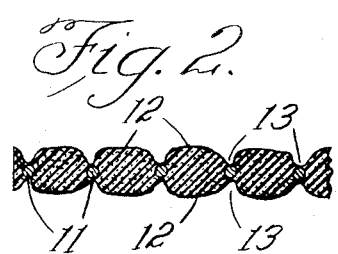
Fig. 2 is a sectional view taken on the line 2—2 of Fig. 1.

Thus when carpeting is laid thereon as indicated at 14 in Fig. 4 the engagement of this material with the floor 15 is such that slippage of the underlay material on the floor is entirely precluded and this underlay material at the same time by engagement of its numerous formations with the underside of the carpeting material prevents any shifting of the carpeting on the underlay so that the carpeting is safely held in any location on the floor without any likelihood or danger of slippage and without any shifting of the carpeting material on the underlay.

Moreover the underlay, as preferably made, is relatively thin so that it does not conspicuously elevate the carpeting or rug thereon although it has at the same time cushioning properties which protect the carpeting and add to the softness thereof. Furthermore the material is waterproof and highly sanitary and does not become filled with dust as occurs with carpet underlay of felt or the like, and it provides a dust proof separator between the carpeting and floor.

In making this underlay material no molds are required or employed and it may be produced economically in a continuous manner with standard equipment. The rubber compound employed is of the well-known type having a leavening agent incorporated therein and which when subjected to heat, prior to or in the initial stages of curing or vulcanization, liberates or forms gas bubbles throughout the mass of rubber and expands same into cellular or spongy form. As in our prior application Serial No. 158,465 filed August 11, 1937, the rubber compound is merely calendered onto the fabric, plain calender rolls, however, being employed so that no specially prepared rolls are required.

Figure 3:
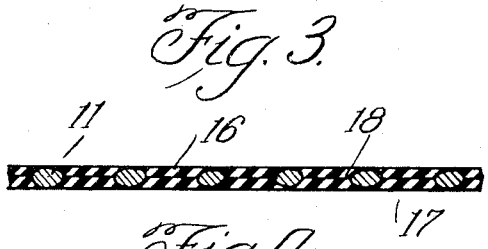
Fig. 3 is a sectional view similar to Fig. 2 but showing the material before the blowing and curing thereof.

A thin layer of the sponge rubber compound is calendered on each side of the fabric as indicated at 16 and 17 in Fig. 3, with sufficient pressure so that the rubber composition completely fills the fabric interstices and the two layers are pressed together and combined in the interstices as indicated at 18 after which the material is laid on a belt or festooned in an oven or vulcanizer and subjected to suitable temperatures to first blow and expand the rubber into the sponge form and thereafter vulcanize same.

The fabric may be dipped in thin cement and run through a wringer to remove surplus cement before calendering the rubber thereon although in practice we have found this unnecessary as the calendering of the rubber onto the opposite sides of the fabric insures an inseparable bonding of the rubber to the fabric which is substantially embedded in the rubber.

Preferably the two laminations 16 and 17 of the rubber compound together are of substantially the same thickness as or only slightly more than the thickness of the fabric, for example with a fabric of $\frac{1}{32}$ inch thickness we prefer to calender on each side thereof a layer of the rubber compound approximately $\frac{1}{64}$ inch thick. Naturally in the calendering of the rubber on the fabric the threads are slightly compressed and there is usually, even in such cases, a very slight thickness of rubber over the threads, which, in effect, amounts to only a mere film of rubber.

In the subsequent blowing and vulcanization of the rubber, as above pointed out the material is laid loosely on a belt or festooned in an oven so that the sponge rubber compound, as in our aforesaid application Serial No. 158,465, is unconfined and entirely free to blow and expand, thereby assuring an unusually soft material. There being a relatively substantial thickness of the compound at the openings or interstices of the fabric a substantial increase in thickness occurs at these places as the rubber compound blows and expands, whereas at the threads there being less of the rubber compound thereover there is correspondingly less increase in thickness at these places. By reason thereof protuberant formations 12 are formed at opposite sides of the fabric at the fabric openings or interstices with depressions or crevasses 13 in the faces of the material at the location of the fabric threads or strands and each side of the fabric is characterized by innumerable small protuberant pads of the soft spongy rubber. Obviously the character and prominence of the formations and protuberances depends upon the relative thickness of the rubber compound at the threads and at the interstices and also upon the characteristics of the fabric employed as well as the blowing characteristics of the rubber compound.

Since these protuberances are free blown without any mold to determine their final shape, these protuberances, while of the same general form, assume random shapes and a roughness of surface which is advantageous as it affords increased resistance against slipping.

In making this material the fabric may be run through the calender and have one layer, for example the layer 16 of rubber composition applied thereon and it may then be reversed and run through the calender again to apply the other layer 17 of rubber compound or both layers may be applied simultaneously or one in advance of the other as shown diagrammatically in Fig. 5.

As shown in said figure the fabric 11 is supplied from any suitable source, not shown, to the plain calender rolls 19 and 20 to which the thin layer 16 of sponge rubber compound is also supplied and this sponge rubber layer 16 is pressed onto the one side of the fabric 11 between the rolls 19 and 20.

The other thin layer 17 of rubber compound is then fed from the rubber sheeting rolls 21, 22 and 23 between the plain rolls 24 and 25 which apply the layer 17 onto the opposite side of the fabric 11, which with its already applied rubber layer 16 is fed from the rolls 19 and 20 to the rolls 24 and 25. Then the composite rubber and fabric material which is then in the form shown in Fig. 3 is conducted directly to a suitable oven or vulcanizer 26 in which it is blown and vulcanized. This oven may be of suitable length and have a suitable carrier or support 27 operating lengthwise thereof at a suitable rate of speed to permit blowing and vulcanization of the rubber layers 16 and 17 during the time that it takes for passage thereof through the vulcanizer 26 and the laminated fabric and unblown rubber compound is fed onto this carrier 27 at one end of the vulcanizer 26 and as it progresses therethrough is first blown and expanded into the spongy form by the heat and thereafter vulcanized or cured so that it emerges from the vulcanizer in finished form.

Instead of employing a carrier 27, the material may be looped over rollers in festoons in a manner well known and the rollers operated to progressively advance the festooned material, or the material may be blown and vulcanized in any other convenient manner that permits free blowing and expanding thereof. Moreover, while it is preferred to calender the rubber compound on both sides of the fabric, it may be calendered only on one side thereof and it will be understood that even in such case the greater thickness of the rubber that occurs at the interstices will cause differential blowing with a corresponding irregularity of finished surface. Also any fabric or reinforcing material may be employed which affords uneven or differential thickness of rubber compound to produce a rough blown surface and of course the rubber compound might also be calendered with a roughness of surface to increase the roughness or irregularity occasioned by the differential thickness of rubber compound occasioned by the interstices or depressions of the fabric.

What is claimed is:

1. In a material of the class described the combination of a layer of open mesh fabric with crossed threads and interstices, two rubber layers applied to the opposite sides respectively of the fabric and bonded together through the fabric interstices, at least one of said layers comprising sponge rubber blown in place and having at the fabric interstices outwardly projecting random shaped protuberances of soft free blown sponge rubber, said protuberances being defined by crevasses opposite the fabric threads.

2. A spongy material of the class described comprising a loosely woven fabric base, a free blown spongy rubber material extending through the interstices in the fabric and intimately bonded to the threads thereof and extending above and below the fabric, the blown surfaces being formed of closely spaced protuberant portions corresponding in location and shape to the fabric interstices and the spaces between the protuberant portions being crevasses defined by threads of the base fabric.

3. A non-skid carpet underlay comprising a layer of open mesh fabric with crossed threads and interstices, and sponge rubber within the interstices of said fabric and intimately bonded to the threads thereof and free blown to protrude from said interstices on at least one side of said fabric in the form of laterally spaced individual protuberances.

4. The method of making spongy sheet materials of the class described which comprises filling the interstices of an open meshed fabric with sponge rubber stock bonded to the fabric threads and of substantially the thickness of the fabric, then subjecting the material while supported and unconfined to a temperature to cause the sponge stock to blow and expand from the interstices on at least one side of the material in the form of individual protuberances, and curing the material to give it a permanent form.

5. The method of making a non-skid carpet underlay having spaced protuberances on at least one side thereof which comprises, calendering blowable sponge rubber compound to at least one side of a woven open mesh fabric with sufficient pressure to fill the interstices of the fabric with rubber not materially thicker than the fabric and to intimately bond the rubber to the fabric threads, freely blowing the sponge compound while the material is supported and unconfined to cause the sponge compound to expand from the interstices on at least one side of the material in the form of individual protuberances, and vulcanizing the material to give permanent form thereto.

VIRGIL H. BODLE.
GEORGE W. BLAIR.